US006427712B1

(12) United States Patent
Ashurst

(10) Patent No.: US 6,427,712 B1
(45) Date of Patent: Aug. 6, 2002

(54) AMBIENT TEMPERATURE SHAPE MEMORY ALLOY ACTUATOR

(75) Inventor: Gary Robert Ashurst, Monroeville, PA (US)

(73) Assignee: Robertshaw Controls Company, Richmond, VA (US)

( * ) Notice: Subject to any disclaimer, the term of this patent is extended or adjusted under 35 U.S.C. 154(b) by 0 days.

(21) Appl. No.: 09/329,190

(22) Filed: Jun. 9, 1999

(51) Int. Cl.[7] ............................. F16K 31/64; E03B 7/10
(52) U.S. Cl. ................................. 137/62; 60/527; 137/2; 137/59; 148/402; 148/563; 148/675; 236/101 D
(58) Field of Search ............................. 60/527; 236/66, 236/93 R, 101 D, 101 R; 237/80; 251/11; 137/59, 62, 2; 148/402, 563, 675

(56) References Cited

U.S. PATENT DOCUMENTS

| | | | | |
|---|---|---|---|---|
| 2,777,303 A | * | 1/1957 | Slattery | 137/62 |
| 3,320,965 A | * | 5/1967 | Morgan | 137/62 |
| 4,522,219 A | * | 6/1985 | Ohkata | 137/62 |
| 4,523,605 A | * | 6/1985 | Ohkata | 137/62 |
| 4,836,496 A | * | 6/1989 | Abujudom et al. | 251/11 |
| 4,881,981 A | * | 11/1989 | Thoma et al. | 148/402 |
| 4,899,543 A | * | 2/1990 | Romanelli et al. | 60/527 |
| 4,932,429 A | * | 6/1990 | Watanabe et al. | 137/62 |
| 4,979,672 A | * | 12/1990 | AbuJudom, ll et al. | 236/101 D |
| 5,001,446 A | * | 3/1991 | Tsuji | 335/43 |
| 5,061,914 A | * | 10/1991 | Busch et al. | 60/527 |
| 5,071,064 A | * | 12/1991 | AbuJudom, ll et al. | 236/101 D |
| 5,079,920 A | * | 1/1992 | Whitehead | 60/527 |
| 5,176,544 A | * | 1/1993 | AbuJudom, ll et al. | 236/101 D |
| 5,619,177 A | * | 4/1997 | Johnson et al. | 60/527 |
| 6,003,538 A | * | 12/1999 | Smith | 137/62 |
| 6,049,267 A | * | 4/2000 | Barnes et al. | 60/527 |
| 6,065,934 A | * | 5/2000 | Jacot et al. | 60/527 |

FOREIGN PATENT DOCUMENTS

JP 0263790 * 12/1985 ................ 137/62

* cited by examiner

Primary Examiner—George L. Walton
(74) Attorney, Agent, or Firm—Fulbright & Jaworski, LLP

(57) ABSTRACT

A novel shape memory alloy (SMA) actuator which responds to changes in ambient temperature. The actuator is capable of operating bidirectionally over a smaller temperature range than conventional SMA actuators by taking advantage of the R-phase characteristics of the SMA material. A coiled SMA spring 14 is provided with an enabled R-phase by limiting recoverable strain in the SMA material to less than about 1 percent. The force of the SMA spring 14 is counteracted by a non-SMA spring 15. The stronger of the two springs 14, 15 controls the position of an actuating element 13, with SMA spring 14 being the stronger spring while in its austenitic phase and being the weaker spring while in its R-phase. Triggering the actuator with entry into the R-phase rather than the martensitic phase during cooling reduces the hysteresis normally associated with an SMA actuator, allowing the actuator to react bidirectionally to smaller changes in ambient temperature. A specific application uses the actuator to control an anti-freeze plug 10 for draining a condensate collector pan 18 through a drain hole 20 when the ambient temperature approaches freezing.

31 Claims, 1 Drawing Sheet

AMBIENT TEMPERATURE SHAPE MEMORY ALLOY ACTUATOR

TECHNICAL FIELD

The present invention discloses a temperature-operated shape memory alloy actuator which can be used for appliance control. The actuator takes advantage of the R-phase of the alloy to confine the actuating temperature to a narrow operating range.

BACKGROUND OF THE INVENTION

Temperature controlled actuators are known, and are usually based on the thermal expansion characteristics of various materials, especially metals. Bi-metal strips, in which the different expansion characteristics of different metals causes the strip to curl, are especially popular. Shape memory alloys (SMA) can also be used in various control applications due to their unusual thermal characteristics.

SMA elements are fabricated with a high temperature "memory" shape. When cooled below the defined transition temperature, the SMA element will retain its high temperature shape under no-load conditions. However, when a load is applied to the SMA element, the SMA element will be deformed. If the load is subsequently removed, the deformation will remain. When the SMA element is then heated above its defined transition temperature, it will return to its original 'memorized' shape. SMA elements are worked to the desired size and then a heat treatment process is necessary to set the high temperature shape of the material. Transformation temperatures increase with increasing heat treatment temperatures. When the alloy is in the "martensitic" phase, below its transition temperature, the material can be easily deformed when a load is applied to it. The alloy will remain in the deformed shape until the alloy is heated above its transformation temperature and changes to its "austenitic" state, whereupon it "remembers" its set shape. Upon cooling below the transformation temperature, the alloy returns to its deformed shape. This is a different phenomenon than the normal thermal expansion and contraction of metal, and occurs because SMA materials have two different phases, with a different crystal lattice structure in each. However, SMA materials exhibit a hysteresis effect, and the "warming" transition temperature is generally higher than the "cooling" transition temperature. The difference in these two transition temperatures is typically between 10–50 deg C, resulting in a wide temperature band in which the material will remain in its current phase, regardless of which phase that might be.

One application of SMA materials involves their use in springs whose spring rate (the force resisting compression or tension) is different in the austenitic phase than in the martensitic phase. Such SMA springs can be used in temperature-sensing mechanical actuators, with actuation being caused when the spring transitions between its two phases because the ambient temperature (and therefore the temperature of the SMA material) passes through the transition temperature. Examples of this application can be found in U.S. Pat. Nos. 4,522,219 and 4,523,605. Unfortunately, accurate bi-directional control with such devices is difficult because the aforementioned hysteresis effect tends to make the device unresponsive in the relatively wide range between the warming and cooling transition temperatures.

A typical use of an SMA spring actuator is to open a drain plug in a cooling system when ambient temperatures approach freezing. Cooling systems such as air conditioners typically condense water vapor out of the air, and collect it in a drain pan. During normal operation, the water in the pan may be picked up by a 'slinger' attached to the condenser fan and propelled against the condenser coils to increase heat transfer efficiency. But if ambient temperatures drop below freezing, the water can freeze, locking up the condenser fan and causing various other problems. An anti-freeze drain hole can be opened when temperatures approach freezing, allowing the water to drain away before it can freeze and cause any problems. The non-electrical nature of an SMA actuator makes it ideal for this application because it does not create a shock hazard. Unfortunately, the wide hysteresis effect of SMA actuators can cause the drain plug to be in an unpredictable state over a wide temperature range, leading to inefficiencies in the cooling system.

A temperature-sensitive SMA actuator is needed that operates bi-directionally over a much smaller temperature range than conventional SMA actuators, so that more precise temperature-related control can be achieved.

DISCLOSURE OF THE INVENTION

The actuator of the present invention can overcome the aforementioned problems by taking advantage of a characteristic of SMA materials called the "R-phase". The R-phase is a martensitic-like phase which, under certain conditions, is present on cooling before the alloy enters the martensitic phase. Under these conditions, the alloy's structure begins to change at a temperature (the "R-threshold") which can be several degrees higher than the normal cooling threshold, and may be within 1.5 deg C of the warming threshold temperature. Upon entering this phase, the crystal structure begins to weaken and change, but does not fully change into the martensitic phase until the temperature drops below the normal cooling threshold temperature. As the alloy enters the R-phase from the austenitic phase, and provided the material does not enter the martensitic phase, very tight temperature hysteresis can be achieved. The R-phase only occurs upon cooling, and only occurs when the recoverable strain in the SMA material is less than a predetermined amount, typically less than about 1%. Recoverable strain is a measure of the difference between the strain in the SMA spring in the austenitic phase in one position and a non-austenitic phase in the other position. When the actuator is thus configured so that the recoverable strain in the SMA spring is within the proper limits to permit creating an R-phase, the R-phase of the SMA material is said to be enabled. Actually entering the R-phase then depends on cooling the SMA spring below the R-threshold.

The actuator of the invention can include opposing springs: an actuating spring of SMA material and a biasing spring of standard spring material such as spring steel. A preferred embodiment places both springs in compression, but the actuator can also be configured with both springs under tension. The forces of the opposing springs can be balanced so that the force of the SMA spring in its strong state is greater than that of the biasing spring, but in its weak state is less than that of the biasing spring. Thus the position of an actuating element can be controlled by the stronger spring, with the stronger spring being determined by the phase of the material in the SMA spring, which is in turn controlled by ambient temperature. By designing the actuator so that the SMA spring material will enter the R-phase during cooling, the hysteresis effect of the SMA material can be reduced to a small temperature range, such as less than 2 deg C.

In a preferred embodiment, the actuator may be part of a cooling system in which the actuator seals a drain hole in a condensate pan with a plug when the temperature is above a predefined threshold temperature, such as 5 deg C, and removes the plug from the drain hole to drain the condensate when the temperature is below that threshold.

BRIEF DESCRIPTION OF THE DRAWING FIGURES

The features and advantages of the present invention will be more clearly appreciated from the following description of the preferred embodiments of the invention taken in conjunction with the accompanying drawing figures, in which like reference numerals indicate like elements, and wherein.

DETAILED DESCRIPTION OF THE PREFERRED EMBODIMENTS

An actuator of the present invention may use two opposing springs which urge an actuating element in different directions, with a preferred embodiment using spiral coiled springs under compression. One spring can be made of SMA material, while the other can be made of a standard spring material such as spring steel. With the two springs opposing each other, the stronger spring can dominate and control the position of the actuating element. The springs may be balanced so that the SMA spring will be the stronger of the two springs while in one of its phases, but the weaker of the two springs while in another of its phases. In this manner, the position of the actuating element can be controlled by changing the phase of the SMA spring material and thereby controlling which spring will dominate.

Figure 1:
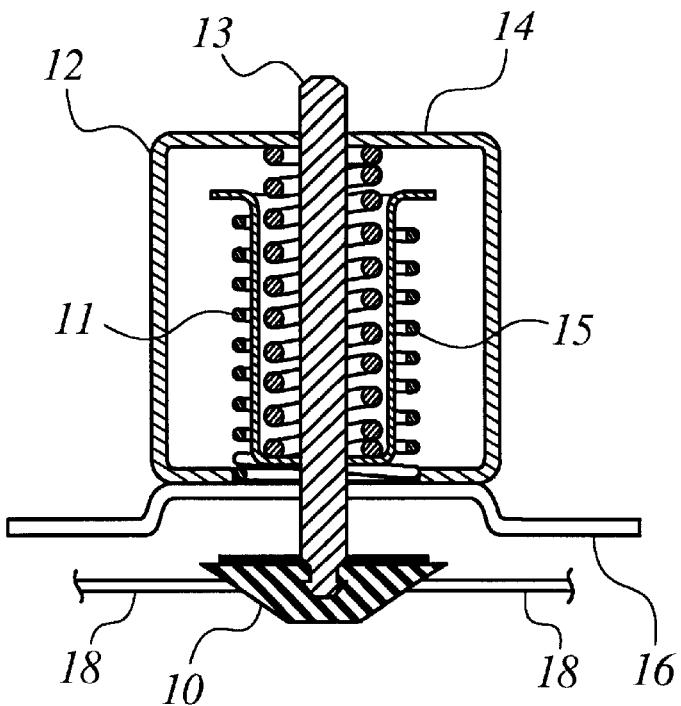
FIG. 1 illustrates the shape memory alloy actuator in the warm position.
Figure 2:
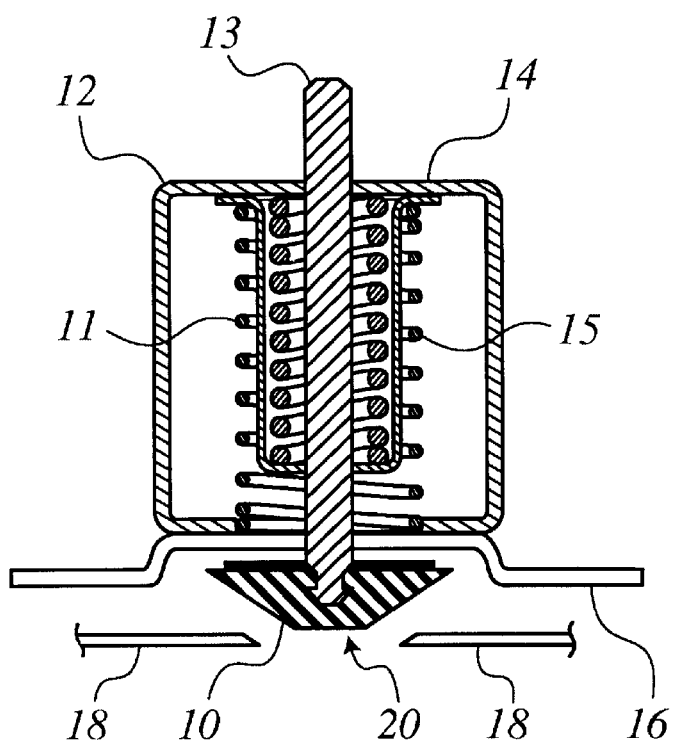
FIG. 2 illustrates the shape memory alloy actuator in the cool position.

FIG. 1 shows an ambient temperature SMA actuator of the invention in the 'warm' position, in which the SMA material is in the austenitic phase. The actuator should be in this position whenever ambient temperature is above the warming transition temperature of the SMA material. FIG. 2 shows the actuator in the 'cool' position, in which the SMA material may be in either the R-phase or martensitic phase. Movement of stem 13 (the actuating element) between the two positions may be substantially linear. As shown in FIGS. 1 and 2, movement of stem 13 may be along an elongated axis of stem 13. Spring restraining element 11 may be attached to stem 13, which may have a plug 10 attached at one end. Spring restraining element 11 may be placed within bias spring 15. SMA spring 14 may be placed around stem 13 and inside restraining element 11. This assembly may then be placed within frame 12, which can be attached to mounting bracket 16, so that both bias spring 15 and SMA spring 14 are under compression, and are urging restraining element 11 in opposite directions. Whichever spring exerts the greater force will overcome the force of the other spring and control the position of stem 13. FIG. 1 shows SMA spring 14 exerting greater force, thereby pressing restraining element 11, stem 13 and plug 10 downward until this motion is stopped when restraining element 11 contacts the bottom of frame 12. FIG. 2 shows bias spring 15 exerting greater force, thereby pressing restraining element 11, stem 13 and plug 10 upward until this motion is stopped when restraining element 11 contacts the top of frame 12.

In a preferred application, plug 10 can be strategically placed so that it closes a drain hole in drain pan 18 as shown in FIG. 1, and opens drain hole 20 as shown in FIG. 2. By designing the actuator so that it opens drain hole 20 when ambient temperature drops to a few degrees above freezing (such as about 5 deg C), the actuator can operate as an anti-freeze control to prevent ice from forming in pan 18 by draining pan 18 before the ambient temperature drops to freezing. At ambient temperatures below the R-phase transition temperature, SMA spring 14 may be weaker than bias spring 15. Bias spring 15 can therefore move stem 13 upwards, removing plug 10 from drain hole 20 and allowing water to drain out. At temperatures above the warming transition temperature, SMA spring 14 may be stronger than bias spring 15. SMA spring 14 will therefore move stem 13 downwards, causing plug 10 to seal drain hole 20 and prevent draining.

Various factors can affect the characteristics of SMA spring 14. The temperatures for warming transition, cooling transition, and R-phase transition can be affected by the material composition of SMA spring 14, the manufacturing techniques used to make it, and the strain placed on SMA spring 14 during operation. Various SMA alloys and manufacturing techniques are known to practitioners in this art. A preferred embodiment can use an alloy consisting of approximately 50% titanium, 47% nickel, and 3% iron. Achieving a force in bias spring 15 which is between the 'weak' and 'strong' forces of SMA spring 14 can also be achieved by controlling the manufacturing parameters of the SMA, including the size of the final spring. This balance can also be achieved by controlling the material or size of bias spring 15. Adjusting (or selecting) the operating compression in either spring can be achieved by controlling the length of restraining element 11 or the dimensions of frame 12, parameters which affect the amount of compression on both springs. A frame can be designed so that these dimensions are adjustable after assembly.

The actuator of the invention can operate over much smaller temperature ranges than conventional SMA actuators. Because of the hysteresis effect of SMA materials, the actuation and recovery transitions in conventional actuators are typically 10–50 deg C apart. The actuator of the invention can reduce this hysteresis to a range of less than 2 deg C by causing the SMA material to enter the R-phase when it cools below the R-phase transition temperature described earlier. The existence of an R-phase is affected by the amount of recoverable strain in the SMA spring, with high recoverable strain causing the material to remain in the austenitic phase until it cools to the cooling transition temperature, and then go directly to the martensitic phase without passing through an R-phase. Thus the R-phase can be enabled by properly configuring the actuator to keep the recoverable strain in the SMA spring sufficiently low. Once enabled, the R-phase can then be entered when the temperature of the SMA material drops below the R-phase transition temperature. In a preferred embodiment, the recoverable strain in SMA spring 14 may be limited to less than 1% to enable an R-phase.

Specific spring parameters for a particular application may vary greatly, depending on the particular application. Spring technology and SMA technology are well-developed fields, and these parameters are determinable by persons of ordinary skill in those arts.

The mechanical configuration shown in FIGS. 1 and 2 permits a very compact actuator. Restraining element 11 may have the overall shape of a cylindrical cup with an outwardly-flaring flange at the open end and a connection to stem 13 at the closed end. The flange may provide a restraining surface for one end of bias spring 15, and the other end of bias spring 15 may be restrained by the bottom of frame 12. The closed end of restraining element 11 may provide a restraining surface for one end of SMA spring 14, and the other end of SMA spring 14 may be restrained by the top of frame 12. This configuration permits spring 14, spring 15, and restraining element 11 to be concentrically arranged about the same portion of stem 13, minimizing the overall size of the actuator. Holes in the top and bottom portions of frame 12 for stem 13 may keep this assembly radially centered, while permitting limited movement in the axial direction. As can be seen from the figures, this axial movement is limited to the difference between the length of restraining element 11 and the distance between the top and bottom of frame 12. This difference may be kept quite small, which can keep the compression of both springs within a small range, resulting in fairly constant and predictable compression forces by those springs regardless of the position of restraining element 11. Of course, this difference is also the distance of linear movement of the actuator, which must be large enough to control whatever device is attached to it.

Although only preferred embodiments of the present invention are specifically illustrated and described herein, it will be appreciated that many modifications and variations of this present invention are possible in light of the above teachings and within the purview of the appended claims without departing from the spirit and intended scope of the invention.

What is claimed is:

1. An actuator comprising:
    an actuating element having first and second positions;
    a biasing spring element exhibiting a biasing spring force and disposed for urging the actuating element towards the second position and away from the first position; and
    a shape memory alloy spring element having an enabled R-phase and disposed for urging the actuating element towards the first position and away from the second position;
    wherein the actuating element is in the first position when a shape memory alloy material of the shape memory alloy spring element is in an austenitic phase and is in the second position when the shape memory alloy material is in the R-phase.

2. The actuator of claim 1, wherein the shape memory alloy spring element exhibits a first spring force greater than the biasing spring force when the shape memory alloy material is in the austenitic phase, and a second spring force less than the biasing spring force when the shape memory alloy material is in the R-phase.

3. The actuator of claim 1, wherein the shape memory alloy spring element and the biasing spring element are each constrained in a state of compression.

4. The actuator of claim 1, wherein the shape memory alloy material exhibits a characteristic warming transition temperature at which the shape memory alloy material can transition to the austenitic phase from one of the R-phase and a martensitic phase, and a characteristic R-phase transition temperature at which the shape memory alloy material can transition to the R-phase from the austenitic phase, the R-phase transition temperature being within about 2 degrees centigrade of the warming transition temperature.

5. The actuator of claim 1, wherein the actuating element includes at least a restraining element having a first restraining surface disposed for restraining an end of the shape memory alloy spring element and a second restraining surface disposed for restraining an end of the biasing spring element, and a stem disposed concentrically within the shape memory alloy spring element, the biasing spring element, and the restraining element.

6. The actuator of claim 1, wherein the shape memory alloy spring element exhibits a recoverable strain of less than about one percent.

7. The actuator of claim 1, wherein the shape memory alloy material includes nickel, titanium, and iron.

8. The actuator of claim 1, further comprising a plug coupled to the actuating element.

9. The actuator of claim 8, further configured for interaction with a drain hole, the drain hole being closed with the plug when the actuating element is in the first position and the drain hole being open when the actuating element is in the second position.

10. The actuator of claim 1, wherein a movement of the actuating element between the first and second positions is substantially linear.

11. The actuator of claim 1, wherein a movement of the actuating elements between the first and second positions is along an elongated axis of the actuating element.

12. A method of actuating, comprising the steps of:
    providing a shape memory alloy spring element exhibiting an enabled R-phase in a shape memory alloy material;
    changing the shape memory alloy material to the R-phase from an austenitic phase when an ambient temperature drops below a first predetermined threshold temperature; and
    moving an actuating element from a first position to a second position when the step of changing to the R-phase occurs.

13. The method of claim 12, wherein:
    the step of providing includes overcoming a force of the biasing spring element with a shape memory alloy spring element when the shape memory alloy material is in the austenite phase; and
    the step of moving includes overcoming a force of the shape memory alloy spring element with the biasing spring element when the shape memory alloy material is in the R-phase.

14. The method of claim 12, whereby the first predetermined threshold temperature is about five degrees Celsius.

15. The method of claim 12, further including:
    changing the shape memory alloy material to the austenitic phase from one of the R-phase and a martensitic phase when an ambient temperature rises above a second predetermined threshold temperature; and
    moving the actuating element from the second position to the first position when the step of changing to an austenitic phase occurs.

16. The method of claim 15, whereby the first and second predetermined threshold temperatures are within about two degrees Celsius of one another.

17. The method of claim 12, wherein the step of providing includes providing the shape memory alloy spring element configured for less than about 1 percent recoverable strain.

18. The method of claim 12, wherein the step of moving includes removing a plug from a drain hole.

19. The method of claim 12, wherein the step of moving includes moving in a substantially linear direction.

20. The method of claim 12, wherein the step of moving includes moving along an elongated axis of the actuating element.

21. A cooling system comprising:
    a condensate pan having a drain hole;
    an actuator including at least:

an actuating element having first and second positions;

a biasing spring element exhibiting a biasing spring force and disposed for urging the actuating element towards the second position and away from the first position; and a shape memory alloy spring element having an enabled R-phase and disposed for urging the actuating element towards the first position and away from the second position;

wherein the actuating element is in the first position when a shape memory alloy material of the shape memory alloy spring element is in an austenitic phase and is in the second position when the shape memory alloy material is in the R-phase.

22. The cooling system of claim 21, wherein the shape memory alloy spring element exhibits a first spring force greater than the biasing spring force when the shape memory alloy material is in the austenitic phase, and a second spring force less than the biasing spring force when the shape memory alloy material is in the R-phase.

23. The cooling system of claim 21, wherein the shape memory alloy spring element and the biasing spring element are each constrained in a state of compression.

24. The cooling system of claim 21, wherein the shape memory alloy material exhibits a characteristic warming transition temperature at which the shape memory alloy material can transition to the austenitic phase from one of the R-phase and a martensitic phase, and a characteristic R-phase transition temperature at which the shape memory alloy material can transition to the R-phase from the austenitic phase, the R-phase transition temperature being within about 2 degrees centigrade of the warming transition temperature.

25. The cooling system of claim 21, wherein the actuating element includes:

a restraining element having a first restraining surface for restraining an end of the shape memory alloy spring element and a second restraining surface for restraining an end of the biasing spring element; and a stem disposed concentrically within the shape memory alloy spring element, the biasing spring element, and the restraining element.

26. The cooling system of claim 21, wherein the shape memory alloy spring element exhibits a recoverable strain of less than about one percent.

27. The cooling system of claim 21, wherein the shape memory alloy material includes nickel, titanium, and iron.

28. The cooling system of claim 21, further comprising a plug coupled to the actuating element.

29. The cooling system of claim 28, wherein:

the plug is configured for interaction with the drain hole; and the drain hole is closed with the plug when the actuating element is in the first position and the drain hole is open when the actuating element is in the second position.

30. The cooling system of claim 21, wherein a movement of the actuating element between the first and second positions is substantially linear.

31. The actuator of claim 21, wherein a movement of the actuating elements between the first and second positions is along an elongated axis of the actuating element.

* * * * *